(12) United States Patent
Yamashita et al.

(10) Patent No.: US 10,391,731 B2
(45) Date of Patent: Aug. 27, 2019

(54) PRESS MACHINE AND METHOD FOR USING PRESS MACHINE

(71) Applicant: KOMATSU INDUSTRIES CORPORATION, Kanazawa-shi, Ishikawa (JP)

(72) Inventors: Shuhei Yamashita, Kanazawa (JP); Hisanori Takeuchi, Kanazawa (JP)

(73) Assignee: KOMATSU INDUSTRIES CORPORATION, Kanazawa-shi, Ishikawa (JP)

( * ) Notice: Subject to any disclaimer, the term of this patent is extended or adjusted under 35 U.S.C. 154(b) by 0 days.

(21) Appl. No.: 15/531,753

(22) PCT Filed: Jan. 15, 2016

(86) PCT No.: PCT/JP2016/051166
§ 371 (c)(1),
(2) Date: May 31, 2017

(87) PCT Pub. No.: WO2016/125563
PCT Pub. Date: Aug. 11, 2016

(65) Prior Publication Data
US 2017/0266904 A1     Sep. 21, 2017

(30) Foreign Application Priority Data
Feb. 6, 2015   (JP) ................. 2015-022364

(51) Int. Cl.
*B30B 15/26*     (2006.01)
*G05B 19/18*     (2006.01)

(52) U.S. Cl.
CPC ............ *B30B 15/26* (2013.01); *G05B 19/182* (2013.01); *G05B 2219/41348* (2013.01)

(58) Field of Classification Search
CPC .................. B30B 15/26; G05B 19/182; G05B 2219/41348

USPC ........................................................ 700/160
See application file for complete search history.

(56) References Cited

U.S. PATENT DOCUMENTS

| 4,283,929 A * | 8/1981 | Heiberger ........... B30B 15/0064 |
| | | 100/259 |
| 4,651,273 A | 3/1987 | Braitinger et al. |
| 2002/0170444 A1* | 11/2002 | Schmitz ................ B30B 15/142 |
| | | 100/257 |

FOREIGN PATENT DOCUMENTS

| CN | 201838831 U | 5/2011 |
| CN | 202045907 U | 11/2011 |
| JP | S56-14100 A | 2/1981 |
| JP | S56-16220 A | 2/1981 |
| JP | S59-91535 A | 5/1984 |
| JP | H07-281838 A | 10/1995 |
| JP | H08-263977 A | 10/1996 |

(Continued)

*Primary Examiner* — Robert E Fennema
*Assistant Examiner* — Marzia T Monty
(74) *Attorney, Agent, or Firm* — Drinker Biddle & Reath LLP (57) ABSTRACT

A press machine includes a memory storing a plurality of function programs for changing a mode of pressing; a connection unit including a plurality of connection terminals; and a controller configured to execute at least one function program among the plurality of function programs stored in the memory, in accordance with a combination of the plurality of connection terminals of the connection unit which are each in one of a conductive state and a non-conductive state.

6 Claims, 9 Drawing Sheets

(56) References Cited

FOREIGN PATENT DOCUMENTS

| JP | H10-125409 A | 5/1998 |
| JP | H11-58100 A | 3/1999 |
| JP | 2001-184106 A | 7/2001 |
| JP | 2010-149125 A | 7/2010 |

* cited by examiner

| T1 | T2 | T3 | T4 | T5 | T6 |

FIG.7

| T1 | SWITCH TO MAKE LONG DIE HEIGHT MODE EFFECTIVE/NON-EFFECTIVE |
| --- | --- |
| T2 | SWITCH TO PROGRESSIVE/ROBOTIC MODE |
| T3 | SETTING FOR MOUNTING QDC |
| T4 | SETTING FOR SPECIFYING QDC TYPE |
| T5 | SETTING FOR MOUNTING POWER STORAGE DEVICE |
| T6 | POWER SUPPLY VOLTAGE VCC |

PRESS MACHINE AND METHOD FOR USING PRESS MACHINE

TECHNICAL FIELD

The present invention relates to a press machine capable of changing the mode of pressing, and a method for using the press machine.

BACKGROUND ART

A press machine configured as an electric servo press includes a servo motor, a power conversion mechanism, and a brake apparatus, for example. The power conversion mechanism includes a ball screw, an eccentricity mechanism, and a link mechanism, for example, and converts a rotational driving force of the servo motor into an up-and-down reciprocating motion (vertical reciprocation) of a slide. The reciprocating motion of the slide allows a workpiece to undergo press working between an upper die and a lower die.

A press machine may be configured to be capable of changing the mode of pressing. The change of the mode of pressing enables the versatility of press working to be enhanced. For example, the mode of press working can be changed to a progressive mode or a robotic mode, for example.

Regarding this, as a common method for changing the mode of pressing, an interface connector or the like for changing the mode depending on a device connected to the press has been proposed (Patent Documents 1 to 3).

CITATION LIST

Patent Document

PTD 1: Japanese Patent Laying-Open No. 7-281838
PTD 2: Japanese Patent Laying-Open No. 8-263977
PTD 3: Japanese Patent Laying-Open No. 10-125409

SUMMARY OF INVENTION

Technical Problem

The interface connector of above-referenced PTD 3 has identifier generation means which generates identifier information for identifying the mode of an electronic device connected to the interface connector. Due to this, the configuration of the interface connector is complicated, resulting in a problem that the parts cost is high.

The present invention has been made in view of this problem. An object of the invention is to provide a press machine capable of switching the mode by means of a simple configuration, and a method for using the press machine.

Solution to Problem

A press machine according to an aspect of the present invention includes: a memory configured to store a plurality of function programs for changing a mode of pressing; a connection unit including a plurality of connection terminals; and a controller configured to execute at least one function program among the plurality of function programs stored in the memory, in accordance with a combination of the plurality of connection terminals of the connection unit which are each in one of a conductive state and a non-conductive state.

In accordance with the present invention, at least one function program among a plurality of function programs for changing the mode of pressing is executed in accordance with a combination of a plurality of connection terminals which are each in the conductive state or the non-conductive state. Thus, in accordance with the combination of a plurality of connection terminals which are each in one of the conductive state and the non-conductive state, the mode of pressing is changed. It is therefore possible to change the mode with the simple configuration.

Preferably, the press machine further includes a control board equipped with the connection unit. The connection unit is thus mounted on the control board, and therefore, the connection unit can more easily be designed.

Preferably, the press machine further includes a connector connectable to the connection unit, and configured to be connected to the connection unit to determine whether the plurality of connection terminals are each in the conductive state or the non-conductive state. As the connector is connected to the connection unit, whether a plurality of connection terminals are each in the conductive state or the non-conductive state is determined, and therefore, the mode can be switched with the simple configuration.

Preferably, the plurality of connection terminals of the connection unit are each formed in a recess shape. The connector has protrusions to be fit in the plurality of connection terminals. The connector is thus formed to have protrusions, and therefore easily fit in the connection unit. Accordingly, the mode can be switched with the simple configuration.

Preferably, one of the plurality of connection terminals is connected to a power supply voltage. The connector causes short circuit between at least one of remaining connection terminals of the plurality of connection terminals and the power supply voltage. Short circuit to the power supply voltage is thus caused, and therefore, the mode can be switched with the simple configuration.

According to another aspect of the present invention, a method for using the press machine as described above includes: connecting the connector to the connection unit including the plurality of connection terminals of the press machine; and performing press working based on at least one function program among the plurality of function programs stored in the memory, in accordance with a combination of the plurality of connection terminals which are each in one of the conductive state and the non-conductive state determined by connecting the connector to the connection unit.

In accordance with the present invention, the connector is connected to the connection unit and accordingly whether the plurality of connection terminals are each in the conductive state or the non-conductive state is determined. Accordingly, at least one function program among the plurality of function programs is executed to change the mode of pressing. Thus, as the connector is connected to the connection terminal, whether a plurality of connection terminals are each in the conductive state or the non-conductive state is determined. It is therefore possible to change the mode with the simple configuration.

Preferably, the method for using the press machine further includes removing the connector connected to the connection unit. The method further includes removing the connector, and therefore, malfunction in changing the mode due to failure of the connector as a result of influences of vibration or the like in press working can be prevented.

Advantageous Effects of Invention

The press machine and the method for using the press machine of the present invention can switch the mode by means of a simple configuration.

DESCRIPTION OF EMBODIMENTS

The present embodiment will be described in detail with reference to the drawings. In the drawings, the same or corresponding parts are denoted by the same reference characters, and a description thereof will not be repeated.

In the present example, a servo press (press machine) equipped with a servo motor will be exemplarily described.

<Overall Configuration>

Figure 1:
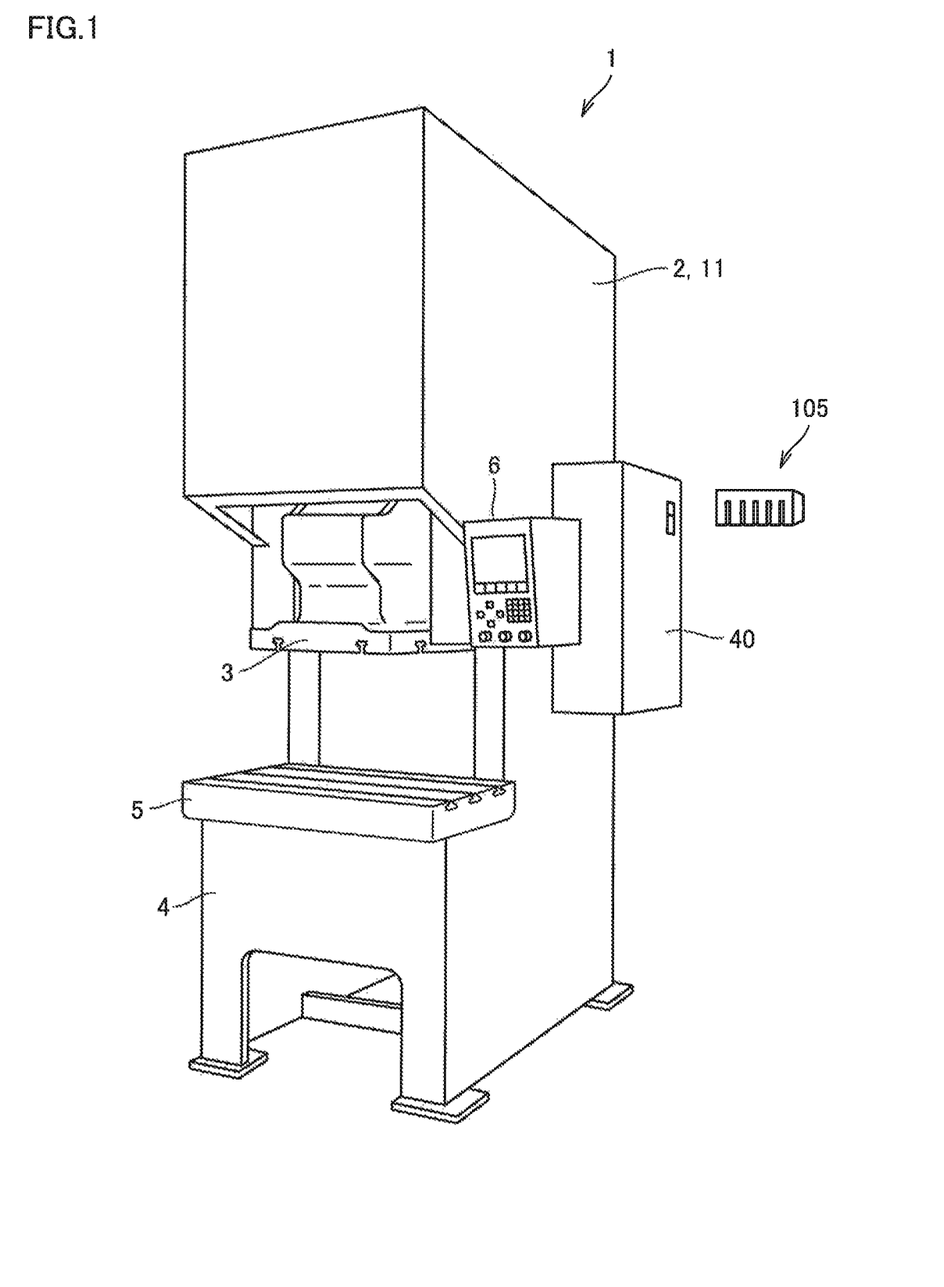
FIG. 1 is a perspective view of a servo press 1 based on the present embodiment.

FIG. 1 is a perspective view of a servo press 1 based on the present embodiment.

As shown in FIG. 1, servo press 1 of the type equipped with no plunger is illustrated by way of example.

Servo press 1 includes a body frame 2, a slide 3, a bed 4, a bolster 5, a control panel 6, and a control device 40.

At a substantially central position of body frame 2 of servo press 1, slide 3 is supported to be movable up and down. Below slide 3, bolster 5 attached onto bed 4 is disposed. At a front portion of body frame 2, control panel 6 is disposed. On a lateral side of body frame 2, control device 40 to which control panel 6 is connected is disposed.

Moreover, a connector 105 to be connected to a control board in control device 40 is provided.

Figure 2:
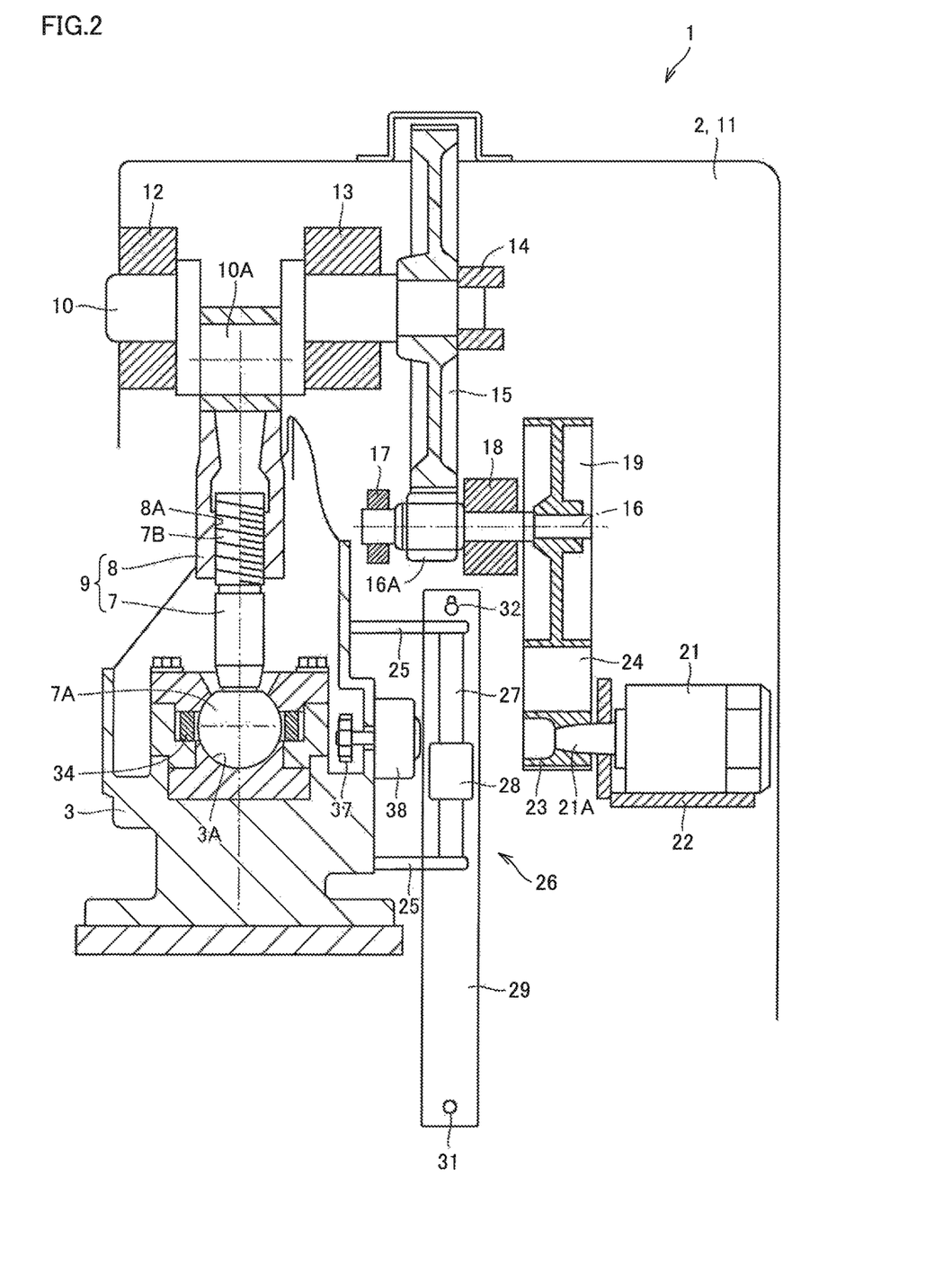
FIG. 2 is a side cross-sectional view showing principal parts of servo press 1.

FIG. 2 is a side cross-sectional view showing principal parts of servo press 1.

Figure 3:
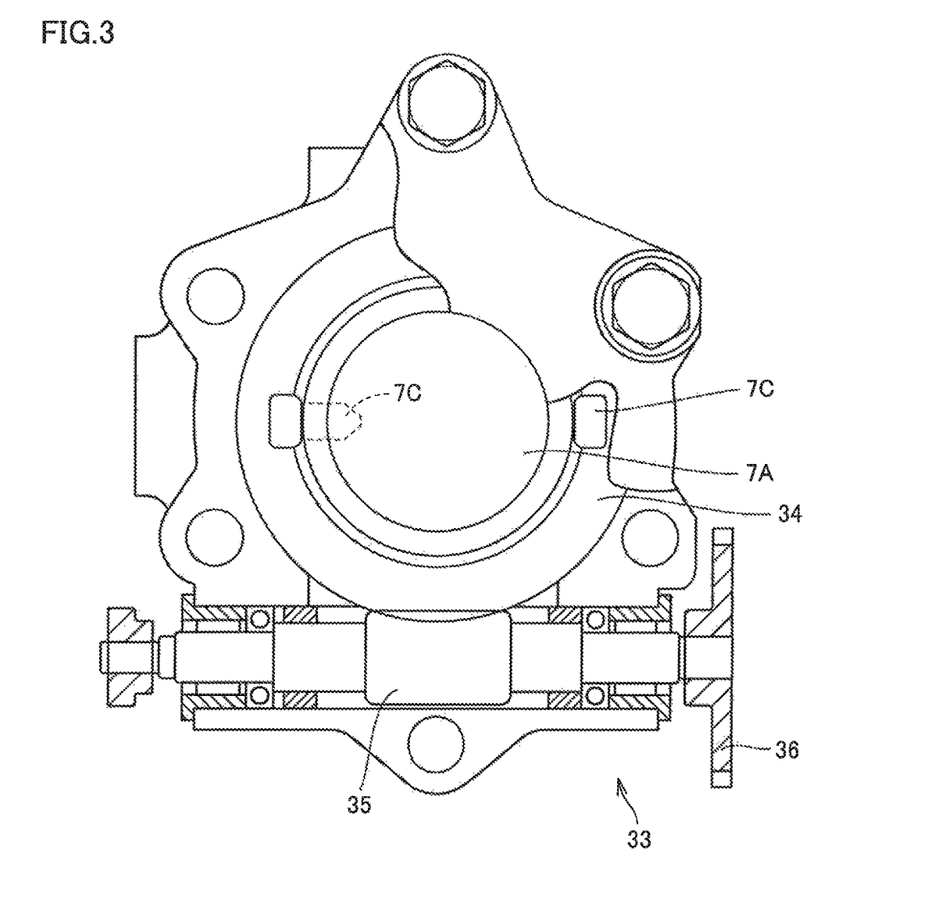
FIG. 3 is a plan view of a partial cross section showing other principal parts of servo press 1.

FIG. 3 is a plan view of a partial cross section showing other principal parts of servo press 1.

As shown in FIG. 2, servo press 1 further includes a servo motor 21, a spherical hole 3A, a screw shaft 7, a sphere 7A, a thread 7B, a connecting rod body 8, a female thread 8A, a connecting rod 9, a main shaft 10, an eccentric portion 10A, a side frame 11, bearings 12 to 14, a main gear 15, a power transmission shaft 16, a transmission gear 16A, bearings 17, 18, and a pulley 19.

In servo press 1, servo motor 21 drives slide 3. In spherical hole 3A formed in an upper portion of slide 3, sphere 7A for adjusting the die height is rotatably inserted in such a manner that prevents sphere 7A disposed at the lower end of screw shaft 7 from falling out. Spherical hole 3A and sphere 7A form a spherical joint. Thread 7B of screw shaft 7 is exposed upward from slide 3 and screwed in female thread 8A of connecting rod body 8 disposed above screw shaft 7. Screw shaft 7 and connecting rod body 8 form extendable connecting rod 9.

The die height refers to the distance from the lower surface the slide to the upper surface of the bolster with slide 3 set at the bottom dead center.

An upper portion of connecting rod 9 is rotatably coupled to crank-shaped eccentric portion 10A disposed on main shaft 10. Main shaft 10 is supported between a pair of right and left thick-plate-shaped side frames 11 which form body frame 2, by bearings 12, 13, 14 arranged at respective three positions in the front-rear direction. To the rear side of main shaft 10, main gear 15 is attached.

Main gear 15 meshes with transmission gear 16A of power transmission shaft 16 disposed below main gear 15. Power transmission shaft 16 is supported between side frames 11 by bearings 17, 18 arranged at respective two positions in the front-rear direction. To the rear end of power transmission shaft 16, pulley 19 to be driven is attached. Pulley 19 is driven by servo motor 21 disposed below pulley 19.

Servo press 1 further includes a bracket 22, an output shaft 21A, a pulley 23, a belt 24, a bracket 25, a position detector 26, a rod 27, a position sensor 28, an auxiliary frame 29, and bolts 31, 32.

Servo motor 21 is supported between side frames 11 with substantially L-shaped bracket 22 located therebetween. Output shaft 21A of servo motor 21 protrudes in the front-rear direction of servo press 1. Motive power is transmitted by belt 24 wound around driven pulley 19 and driver pulley 23 which is disposed on output shaft 21A.

To the back side of slide 3, a pair of brackets 25 is attached that protrude rearward from two positions, namely the upper position and the lower position, toward the space between side frames 11. Between upper and lower brackets 25, rod 27 forming a part of position detector 26 such as linear scale is attached. This rod 27 is equipped with a scale for detecting the position in the top-bottom direction of slide 3, and inserted to be movable up and down through position sensor 28 which also forms a part of position detector 26. Position sensor 28 is secured to auxiliary frame 29 disposed on one side frame 11.

Auxiliary flume 29 is formed in a vertically elongate shape, has its lower portion attached to side frame 11 with bolt 31 and its upper portion supported slidably up and down with bolt 32 which is inserted in a vertically long hole. Thus, only one of the upper side and the lower side (the lower side in the present embodiment) of auxiliary frame 29 is secured to side frame 11, and the other side thereof is supported movably up and down. Therefore, auxiliary frame 29 is not influenced by elongation/contraction, due to temperature variation, of side frames 11. In this way, position sensor 28 is capable of accurately detecting the slide position and the die height position without being influenced by such elongation/contraction of side frames 11.

In contrast, the slide position of slide 3 and the die height are adjusted by a slide position adjustment mechanism 33 disposed in slide 3. As also shown in FIG. 3, slide position adjustment mechanism 33 includes a warm wheel 34 attached to the outer periphery of sphere 7A of screw shaft 7 with a pin 7C, a warm gear 35 meshing with warm wheel 34, an input gear 36 attached to an end of warm gear 35, and an induction motor 38 having an output gear 37 meshing with input gear 36. Induction motor 38 has a flat shape having a relatively shorter axial length and is formed compactly. Rotational motion of induction motor 38 is adjusted by rotating screw shaft 7 through warm wheel 34.

Control panel 6 is used for entering various types of data for setting motion control for the slide, and has a display which shows a switch and ten keys for entering motion data as well as the input data and setting data having been set and registered.

As the display, a programmable display having a clear touch switch panel mounted on the front face of a graphic display such as liquid crystal display or plasma display is used.

Control panel 6 may also include a data input device for data from an external storage medium such as such as IC card on which stored motion data set in advance, or include a communication device for transmitting/receiving data in the wireless manner or through a communication line.

From control panel 6 in the present embodiment, a working pattern appropriate for molding conditions, namely a slide control pattern can be selected and set, such as rotation pattern, rotational reciprocation pattern, pendulum pattern, and reverse pattern. Moreover, depending on the working pattern, the motion data is defined to specify whether to show the height position of slide 3 by the actually detected value of position detector 26 or by the value calculated by operation as described later herein.

The "rotation" pattern which is one of the control patterns is implemented by rotating main shaft 10 in only the positive rotational direction, and refers to a motion of causing slide 3 to start moving from the top dead center, pass the bottom dead center, and reach again the top dead center, per movement of one shot with respect to a workpiece.

The "rotational reciprocation" pattern refers to a motion of causing slide 3, per movement of one shot with respect to a workpiece, to start moving from the top dead center in the positive rotational direction, stop at a working end position before the bottom dead center, and rotate from this position in the opposite direction to return to the top dead center, and causing slide 3, per movement of one shot with respect to the next workpiece, to start moving from the top dead center in the reverse rotational direction, stop at a working end position before the bottom dead center, and rotate from this position in the positive rotational direction to return to the top dead center. Namely, main shaft 10 alternately makes the positive rotation and the reverse rotation each per workpiece.

"Pendulum pattern" causes slide 3, per movement of one shot with respect to a workpiece, to start moving from the top dead center or an upper limit point lower than the top dead center in the positive rotational direction, pass the bottom dead center, and stop at the top dead center or the upper limit point before the top dead center. Then, for the shot with respect to the next workpiece, slide 3 is caused to start moving in the reverse rotational direction, pass the bottom dead center, and reach the top dead center or the original upper limit point to stop. Namely, main shaft 10 alternately makes the positive rotation and the negative rotation for each workpiece.

The "reverse pattern" refers to a motion, per movement of one shot with respect to a workpiece, of causing slide 3 to start moving from the top dead center or an upper limit point lower than the top dead center in the positive rotational direction, stop at a working end position before the bottom dead center, and rotate from this working end position in the reverse rotational direction to return to the top dead center or the upper limit point. Namely, main shaft 10 makes positive and negative rotations per shot.

<Functional Configuration of Control Board>

Figure 4:
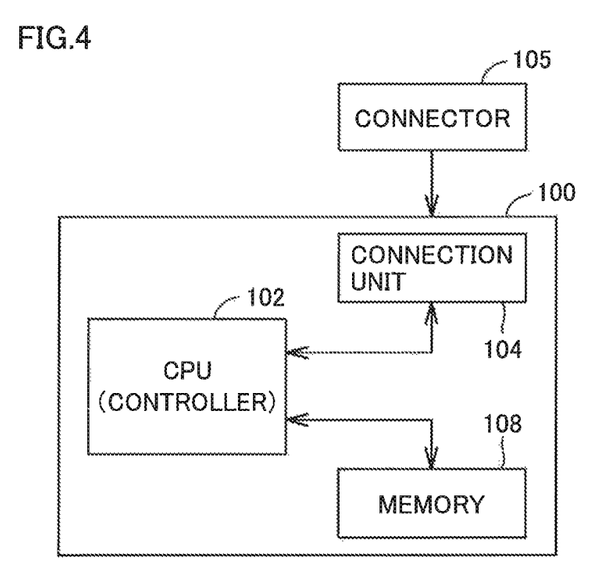
FIG. 4 is a block diagram showing a configuration of a control board 100 in a control device 40.

Next, a control board 100 in control device 40 will be described.

FIG. 4 is a block diagram showing a configuration of control board 100 in control device 40.

In FIG. 4, although illustration of details in the drawing and description thereof of control board 100 are not given herein, control board 100 is configured to include a CPU (Central Processing Unit), a high-speed arithmetic operation processor or the like as a main device, and configured to also include a computer performing an arithmetic/logical operation on input data in accordance with a predetermined procedure, and a memory, for example.

In this example, a configuration is shown which includes a CPU (controller) 102, a memory 108, and a connection unit 104 which are disposed on control board 100. Connection unit 104 is provided for changing the mode of press working.

CPU 102 performs various types of arithmetic operations for controlling the overall press machine, and outputs control commands.

Memory 108 is connected to CPU 102. Memory 108 stores various (a plurality of) programs concerning press working. In memory 108, a program (functional program) concerning each mode of press working is also included. CPU 102 reads the functional program from memory 108 to thereby control press working as appropriate for each mode.

Connection unit 104 is configured to be connectable with connector 105.

As connector 105 is attached to connection unit 104, a signal is input to CPU 102.

Receiving the signal from connection unit 104, CPU 102 changes the mode of press working.

Specifically, connection unit 104 includes a plurality of connection terminals. CPU 102 changes the mode of press working in response to input of a signal which depends on a combination of a plurality of connection terminals which are each in one of the conductive state and the non-conductive state.

Figure 5:
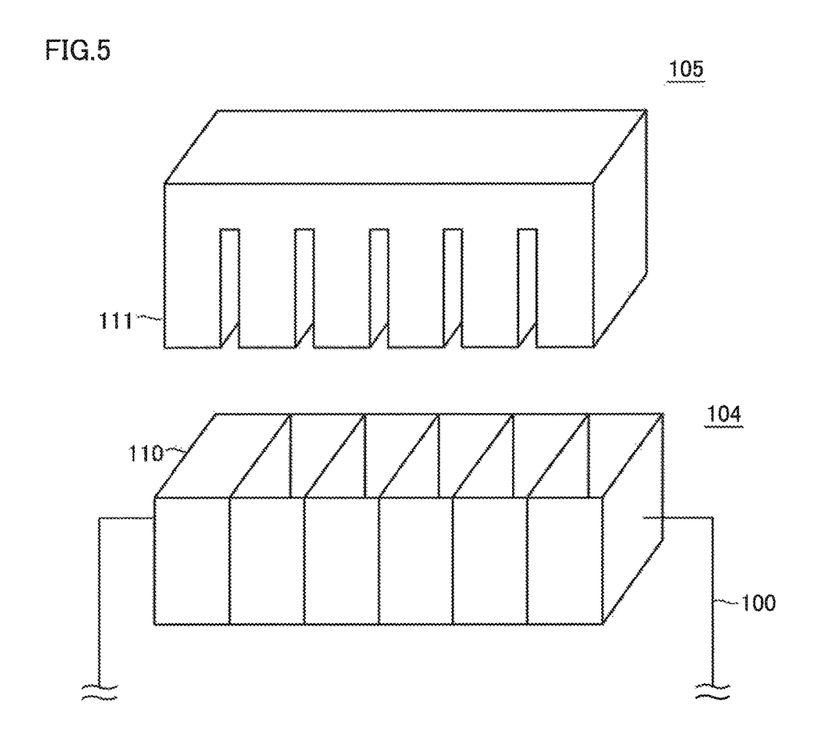
FIG. 5 is a diagram illustrating external appearances of a plurality of connection terminals of a connection unit 104 and a connector 105 based on an embodiment.

FIG. 5 is a diagram illustrating external appearances of a plurality of connection terminals of connection unit 104 and connector 105 based on an embodiment.

FIG. 5 shows connection unit 104 disposed on control board 100 that includes six connection terminals as an example of a plurality of connection terminals.

Connection unit 104 includes connection terminals 111 each in the form of a recess.

Moreover, connector 105 including six connection terminals as an example of a plurality of connection terminals is shown.

Connector 105 includes connection terminals 110 in the form of projections.

A plurality of recess connection terminals 111 of connection unit 104 and a plurality of projection connection terminals 110 of connector 105 are configured so that associated connection terminals integrally fit each other.

Moreover, connector 105 determines a combination of a plurality of connection terminals which are each in one of the conductive state and the non-conductive state to selectively short-circuit a plurality of connection terminals of connection unit 104.

Connectors 105 have the same external shape. However, the interconnection pattern of connector 105 for shortcircuiting, in the connector, a plurality of connection terminals is different depending on the type of connector 105.

Figure 6:
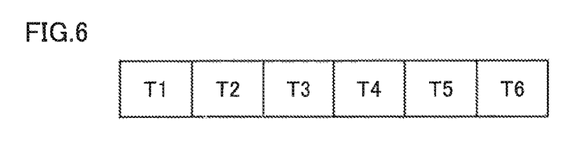
FIG. 6 is a diagram illustrating a plurality of connection terminals of connection unit 104 based on an embodiment.

FIG. 6 is a diagram illustrating a plurality of connection terminals of connection unit 104 based on an embodiment.

As shown in FIG. 6, a case where six connection terminals T1 to T6 are provided is illustrated. To each connection terminal T, a function is allocated in advance.

In this example, a description will be given of six connection terminals as a plurality of connection terminals. However, the number of connection terminals is not limited to six, and the design can be changed to provide any two or more connection terminals.

Figure 7:
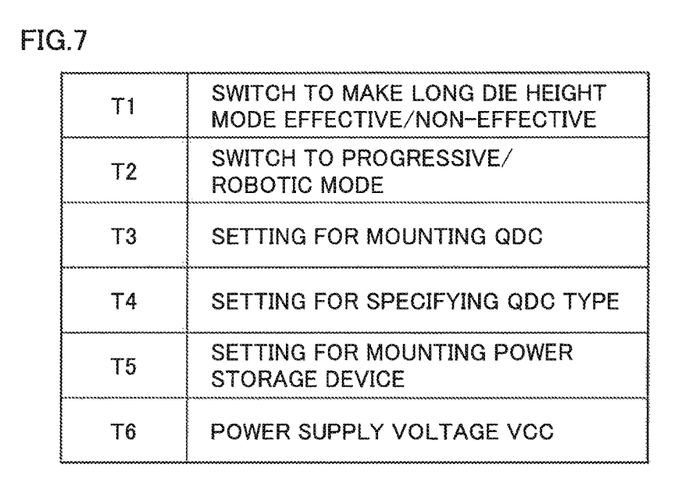
FIG. 7 is a diagram illustrating respective functions of connection terminals T1 to T6.

FIG. 7 is a diagram illustrating respective functions of connection terminals T1 to T6.

As shown in FIG. 7, a case where six functions are allocated to respective six connection terminals T1 to T6 is illustrated by way of example.

Connection terminal T1 is used to make a switch to activate/cancel a long die height mode in which the die height is set longer than usual. Specifically, when connection terminal T1 is non-conductive, this mode is cancelled. In contrast, when connection terminal T1 is conductive, this mode is activated. The long die height mode is a mode in which the position of the upper surface of bolster 5 is changed to set longer than usual the distance between the position of the lower surface of slide 3 and the position of the upper surface of bolster 5. The die height is thus changed and accordingly parameters for press working are adjusted.

Connection terminal T2 is used to make a switch to the progressive mode/robotic mode. Specifically, when connection terminal T2 is non-conductive, the progressive mode is set active. In contrast, when connection terminal T2 is conductive, the robotic mode is set active. As one of these modes is set active, the manner of cooperation control with a peripheral device (such as robot or transport device) is changed.

Connection terminal T3 is used to mount a die change system (Quick Die Change System: QDC). Specifically, when connection terminal T3 is non-conductive, the die change system is set non-operative. In contrast, when connection terminal T3 is conductive, the die change system is set operative. When the die change system is set operative, an error check function of the die change system is set effective.

Connection terminal T4 is relevant to setting of the type of the die change system. Specifically, when connection terminal T4 is non-conductive, the die change system is configured to include a die lifter. When connection terminal T4 is conductive, the die change system is configured to include a die clamp and a die lifter. When the type of the die change system is specified, an error check function appropriate for the specified type of the die change system is set effective.

Connection terminal T5 is used to mount a power storage device. Specifically, when connection terminal T5 is non-conductive, the power storage device is set non-operative. In contrast, when connection terminal T5 is conductive, the power storage device is set operative. When the power storage device is set operative, the machine is configured to supply power from the power storage device. The power storage device is used as an auxiliary power supply for press working. The power storage device can be provided to suppress variation of power supply from a power line.

Connection terminal T6 is a terminal to which power supply voltage VCC is supplied. In this example, connector 105 is attached to selectively cause short circuit between connection terminal T6 and other connection terminals T1 to T5. Based on whether or not short circuit occurs between connection terminal T6 and connection terminals T1 to T5, a combination of connection terminals T1 to T5 which are each in one of the conductive state and the non-conductive state is determined.

The above-described functions are given herein by way of example. Functions are not limited to them, and other functions may be added or some of the functions may not be included.

Figure 8:
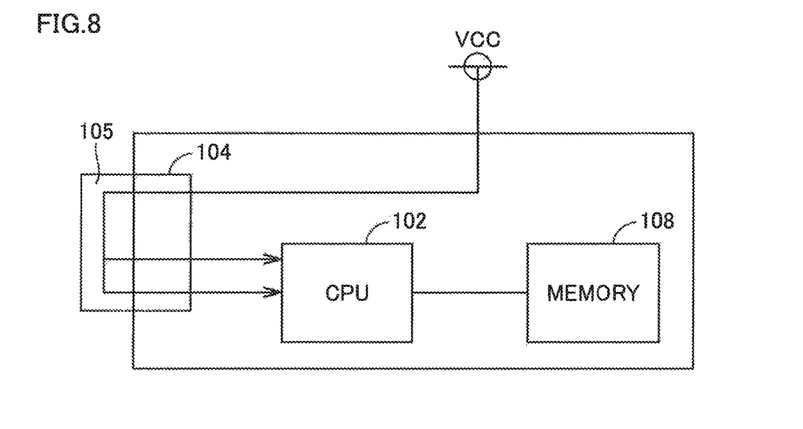
FIG. 8 is a conceptual diagram showing a case where connector 105 is attached to connection unit 104 based on an embodiment.

FIG. 8 is a conceptual diagram showing a case where connector 105 is attached to connection unit 104 based on an embodiment.

As shown in FIG. 8, connector 105 can be fit in connection unit 104 to thereby cause short circuit between connection terminal T6 at power supply voltage VCC and other connection terminals.

Connection terminals T1 to T5 are selectively electrically connected to power supply voltage VCC ("H" level) through connector 105 and accordingly become conductive. When connection terminals T1 to T5 are not made conductive, they are grounded ("L" level).

Receiving input of a voltage signal representing the conductive state ("H" level)/non-conductive state ("L" level) of connection terminals T1 to T5, CPU 102 implements the above-described functions.

Specifically, CPU 102 refers to memory 108 based on whether connection terminals T1 to T5 are conductive/non-conductive, and reads a plurality of function programs stored in memory 108 to thereby implement desired functions. For example, when CPU 102 detects that connection terminal T1 is in the conductive state, CPU 102 reads function programs stored in memory 108 for making a change to the long die height mode and changes parameters for press working.

When CPU 102 detects that connection terminal T2 is in the conductive state, CPU 102 reads function programs stored in memory 108 for making a change to the robotic mode and changes the manner of control to the one for the robotic mode for press working.

When CPU 102 detects that connection terminal T3 is in the conductive state, CPU 102 reads function programs stored in memory 108 for making a change to the die change system and changes the manner of control to the one using the die change system for press working.

When CPU 102 detects that connection terminal T4 is in the conductive state, CPU 102 reads function programs stored in memory 108 for making a change to the die change system which includes a die clamp and a die lifter and changes the manner of control to the one using the die change system for press working.

When CPU 102 detects that connection terminal T5 is in the conductive state, CPU 102 reads function programs stored in memory 108 for changing to mount a power storage device, and changes the manner of power supply control to the one using the power storage device for press working.

Different types of connectors 105 are prepared each based on a pattern of combination of short-circuited connection terminals among a plurality of connection terminals. The different types of connectors 105 differ from one another in terms of the pattern of combination of short-circuited terminals (pattern of combination of multiple functions).

Figure 9:
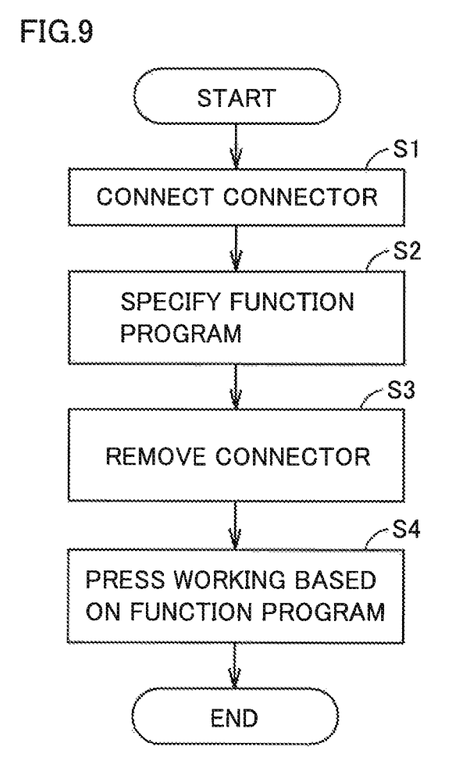
FIG. 9 is a flow diagram illustrating a method for using the press machine based on an embodiment.

FIG. 9 is a flow diagram illustrating a flow of a method for using a press machine based on an embodiment.

As shown in FIG. 9, initially connector 105 is connected (step S1).

Specifically, connector 105 is attached to connection unit 104. By way of example, at the time of shipment from a press machine factory, an appropriate connector 105 is attached so that an optimum function is performed depending on a manner of use at a site of destination of the shipment. When a function change is required at the site of destination of the shipment, connector 105 adapted to change of the function is attached to the press machine. In order to implement a desired function, it is therefore necessary to attach an appropriate connector 105.

Based on this, in accordance with a combination of connection terminals T1 to T5 which are each in one of the conductive state and the non-conductive state, a desired function program is specified (selected) from a plurality of function programs (step S2).

The selected function program is read by CPU 102 and accordingly the mode of press working is changed.

Then, connector 105 is removed (step S3). Specifically, connector 105 is disconnected from connection unit 105.

Then, press working is performed based on the changed mode (step S4).

Accordingly, the press working is completed (END).

The press machine is installed in a special environment such as factory, and it is necessary to sufficiently consider the safety aspect and the like. Therefore, if the mode can be changed simply by turning on/off a switch or the like, there is a possibility that the mode is easily changed by malfunction. In view of this, a system changing the mode by attaching an appropriate connector, rather than changing the mode easily by turning on/off a switch or the like, can be used to suppress easy change of the mode due to malfunction and thereby ensure the safety aspect.

The system in this example attaches connector 105 to change the mode in accordance with a combination of a plurality of connection terminals which are each in one of the conductive state and the non-conductive state. Specifically, short circuit at a contact between connection terminals is specified through connector 105 to thereby select a mode. Thus, the cost can be reduced to a greater extent relative to the case where the interface connector is used, and the mode can be switched with the simple configuration.

When the mode of press working is changed by attaching connector 105, CPU 102 holds the state of change of the mode. Specifically, CPU 102 stores in memory 108 information about the state of change of the mode. Even when the power supply fails and thereafter recovers from the failure, CPU 102 performs press working based on a mode changed based on the information stored in memory 108.

Therefore, in the case where connector 105 is attached and accordingly change of the mode of press working is completed, connector 105 is removed. The press machine is therefore used with connector 105 disconnected, when the change of the mode of press working is completed.

After the change of the mode of press working is completed, connector 105 is removed (disconnected). It is thus possible to prevent malfunction in changing the mode due to failure of connector 105 resultant from influences of vibration or the like in press working. By removing connector 105, easy change of the mode of press working can be suppressed and malfunction can be prevented to ensure the safety aspect.

Connector 105 can be used only for the purpose of changing the mode of press working, to thereby use the connector as a general-purpose connector for changing the mode of other press machines.

Information about the state of change of the mode of press working which is stored in memory 108 may be indicated on the display of control panel 6 to allow the information to be confirmed. Specifically, CPU 102 follows an instruction to read the information and causes the information to be indicated on the display of control panel 6. This configuration enables an operator to easily confirm the mode of press working through control panel 6, even when connector 105 is not attached.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 servo press; 2 body frame; 3 slide; 3A spherical hole; 4 bed; 5 bolster; 6 control panel; 7 screw shaft; 7A sphere; 7B thread; 8 connecting rod body; 8A female thread; 9 connecting rod; 10 main shaft; 10A eccentric portion; 11 side frame; 12, 13, 14, 17, 18 bearing; 15 main gear; 16 power transmission shaft; 16A transmission gear; 19, 23 pulley; 21 servo motor; 21A output shaft; 22, 25 bracket; 24 belt; 26 position detector; 27 rod; 28 position sensor; 29 auxiliary frame; 31, 32 bolt; 40 control device; 100 control board; 102 CPU; 104 connection unit; 105 connector; 108 memory

The invention claimed is:

1. A press machine comprising:
 a memory configured to store a plurality of function programs for changing a mode of pressing;
 a connection unit including a plurality of connection terminals and configured to receive a connector, wherein the connector is disconnected during operation of the press machine, wherein, when the connector is connected to the connection unit prior to operation of the press machine, a first of the plurality of function programs is stored in memory, when the connector is connected to the connection unit a state change from the first of the plurality of function programs to a second of the plurality of function programs is stored in memory, and after the connector is disconnected, the second of the plurality of function programs is stored in memory and executed during operation of the press machine; and
 a controller configured to execute at least one function program among the plurality of function programs stored in the memory, in accordance with a combination of the plurality of connection terminals of the connection unit which are each in one of a conductive state and a non-conductive state.

2. The press machine according to claim 1, further comprising a control board equipped with the connection unit.

3. The press machine according to claim 1, further comprising the connector connectable to the connection unit, and configured to be connected to the connection unit to determine whether the plurality of connection terminals are each in the conductive state or the non-conductive state.

4. The press machine according to claim 3, wherein
 the plurality of connection terminals of the connection unit are each formed in a recess shape, and
 the connector has protrusions to be fit in the plurality of connection terminals.

5. The press machine according to claim 3, wherein
 one of the plurality of connection terminals is connected to a power supply voltage, and the connector causes short circuit between at least one of remaining connection terminals of the plurality of connection terminals and the power supply voltage.

6. A method for operating a press machine, wherein the press machine comprises a memory configured to store a plurality of function programs for changing a mode of pressing, a connection unit including a plurality of connection terminals and configured to receive a connector, and a controller configured to execute at least one function program among the plurality of function programs stored in the memory, the method comprising:

connecting the connector to the connection unit including the plurality of connection terminals of the press machine, wherein when the connector is connected to the connection unit prior to operation of the press machine, a first of the plurality of function programs is stored in the memory;

storing a second of the plurality of function programs in the memory, wherein when the connector is connected to the connection unit a state change from the first of the plurality of function programs to the second of the plurality of function programs is stored in memory;

disconnecting the connector before operation of the press machine, wherein after the connector is disconnected, the second of the plurality of function programs is executed during operation of the press machine; and performing press working based on at least one function program among the second of the plurality of function programs in the memory, in accordance with a combination of the plurality of connection terminals which are each in one of the conductive state and the nonconductive state determined by connecting the connector to the connection unit, wherein the connector is disconnected during operation of the press machine.

* * * * *